United States Patent [19]

Chaplin

[11] 4,314,792

[45] Feb. 9, 1982

[54] TURBINE SEAL AND VANE DAMPER

[75] Inventor: Gary F. Chaplin, Vernon, Conn.

[73] Assignee: United Technologies Corporation, Hartford, Conn.

[21] Appl. No.: 971,287

[22] Filed: Dec. 20, 1978

[51] Int. Cl.³ .............................................. F01D 11/08
[52] U.S. Cl. .................................... 415/116; 415/175; 415/135
[58] Field of Search ............... 415/115, 116, 117, 136, 415/217, 135, 138, 175

[56] References Cited

U.S. PATENT DOCUMENTS

| 3,043,559 | 7/1962 | Bauer et al. | 415/138 |
| 3,169,749 | 2/1965 | Harris | 415/135 X |
| 3,295,824 | 1/1967 | Woodwell et al. | 415/178 |
| 3,326,523 | 6/1967 | Bobo | 415/218 |
| 3,394,919 | 7/1968 | Catterfeld | 415/138 |
| 3,408,044 | 10/1968 | Burger | 415/117 |
| 3,730,640 | 5/1973 | Rice et al. | 415/117 |
| 3,754,766 | 8/1973 | Asplund | 415/172 A |
| 3,893,786 | 7/1975 | Rahnke et al. | 415/138 X |
| 3,957,391 | 5/1976 | Vollinger | 415/116 |
| 3,990,807 | 11/1976 | Sifford | 415/115 |
| 3,992,126 | 11/1976 | Brown et al. | 415/115 |
| 4,053,254 | 9/1977 | Chaplin et al. | 415/115 |
| 4,213,296 | 7/1980 | Schwarz | 415/116 X |
| 4,230,436 | 10/1980 | Davison | 415/138 X |
| 4,242,042 | 12/1980 | Schwarz | 415/116 |

FOREIGN PATENT DOCUMENTS

| 218146 | 7/1924 | United Kingdom | 415/135 |
| 147194 | 10/1962 | U.S.S.R. | 415/135 |

Primary Examiner—Everette A. Powell, Jr.
Attorney, Agent, or Firm—Gene D. Fleischhauer

[57] ABSTRACT

A seal member for a gas turbine engine is disclosed. Various construction details which increase sealing effectiveness and which enable the damping of vibrations in a plurality of vanes are developed. The seal member is disposed between the engine case and a plurality of stator vanes. The seal member has a flexible center section which is compressed in the installed position.

15 Claims, 2 Drawing Figures

TURBINE SEAL AND VANE DAMPER

BACKGROUND OF THE INVENTION

1. Field of the Invention

This invention relates to gas turbine engines, and more particularly to a seal member for a coolant cavity in the turbine case of such an engine.

2. Description of the Prior Art

A gas turbine engine has a compression section, a combustion section and a turbine section. A rotor extends axially through the turbine section. A row of rotor blades extend outwardly from the rotor. A stator circumscribes the rotor. The stator includes an engine case, an outer air seal and rows of stator vanes. The engine case positions and supports the outer seal and the stator vanes. The outer air seal is radially spaced from the row of rotor blades leaving a tip clearance therebetween. Working medium gases are pressurized in the compression section, burned with fuel in the combustion section and expanded in the turbine section. The temperature of the working medium gases discharging from the combustion section into the turbine often exceeds fourteen hundred degrees Celsius (1400° C.).

The hot gases entering the turbine section lose heat to the turbine blades and the case. Uncontrolled heating of the case may decrease engine efficiency as the outer air seals are displaced outwardly with increasing case diameter.

In modern engines, cooling air is flowed through passages and cooling air chambers on the interior of the case to remove heat from the case. The case forms the outer wall of each cooling chamber. Each cooling air chamber has an inner wall to suppress heat transfer to the case. The inner wall, having an inner surface facing the hot gases, shields a portion of the outer case from radiation. The inner wall functions to block both the hot gases from contacting a portion of the outer case and the cooling air from flowing into the hot gas path.

U.S. Pat. No. 3,730,640 to Rice et al. entitled "Sealed Ring for Gas Turbine" is representative of structures in which the outer surface of a ring cooperates with the inner surface of a case to form a cooling cavity. The ring forms an inner wall having a "Z" shape. In Rice et al., cooling air flows between a flange on the Z-ring and a flange on the case to enter the cooling cavity. The cooling air flows out of the cooling cavity to a downstream location through holes in a downstream flange. Rice et al. is not especially concerned with cooling air leakage through the inner wall. Cooling air flows through the Z-ring to a cooling air cavity formed by the outer surface of the Z-ring and the inner surface of a vane platform. Rice et al. does not attempt to form an airtight seal between the ring and the upstream flange and the ring and the downstream flange.

In U.S. Pat. No. 3,992,126 to Brown et al. entitled "Turbine Cooling", an annular air cavity is formed by a deformable ring and the outer case. The deformable ring acts as the inner wall. Cooling air exits from the chamber through orifices in the ring underneath the vane platform and between adjacent vanes. The ring engages an upstream flange extending inwardly from the case and a downstream flange extending inwardly from the case.

In addition to heating the case, the hot gases cause another problem. As the working medium gases expand through the turbine section, the gases exert nonuniform aerodynamic forces on the vanes. These forces are the primary cause of vane vibration during high speed turbomachine operation. The vibrations and the forces can create high stresses in the vanes which ultimately may cause fatigue failure.

Many engines use vibration dampers to dampen these vibrations. U.S. Pat. No. 3,326,523 to Bobo entitled "Stator Vane Assembly Having Composite Sectors", is representative of structures in which a damping means engages a base of a vane to provide vibration damping. The invention in Bobo employs a spring member mounted in an arcuate groove having a dovetail shape. U.S. Pat. No. 3,730,640 to Rice et al. employs a circumferentially extending spring to position and dampen a circumferentially extending ring serving as an outer air seal. The use of vibration dampers enhances the fatigue life of the vanes.

Although the fatigue life, the creep resistance and the performance of the turbine case are enhanced by using cooling air to reduce case temperatures, there is a penalty. The increased performance of the engine resulting from the improved blade tip clearance control is diminished by the use of cooling air. Accordingly, scientists and engineers are working to design a seal ring for cooling air chambers having increased sealing effectiveness, an adequate fatigue life, and an ability to dampen vane vibration.

SUMMARY OF THE INVENTION

A primary object of the present invention is to increase the sealing effectiveness of a seal structure which extends circumferentially between a portion of an array of stator vanes and an outer case in an axial flow rotary machine. Another object is to dampen vibratory movement of the vane array. An object is to ensure an adequate fatigue life of the seal structure.

According to the present invention a metal ring circumscribes a portion of an array of stator vanes and is compressed axially by the vanes and an outer case to provide sealing therebetween.

A primary feature of the present invention is a metal ring having an upstream leg and a downstream leg. The metal ring has a center section that extends radially. Another feature is an upstream end of the seal structure, which presses axially against the outer case. A downstream end presses axially against the array of stator vanes. In one embodiment an upstream leg presses radially against the array of vanes and both radially and axially against the outer case.

A principal advantage of the present invention is an effective seal against radial leakage of cooling air into the gas path which results from the positive contact between the metal ring and the outer case. Vibratory damping results from the positive contact between the metal ring and the vane. An adequate fatigue life is ensured by the flexible center section.

The foregoing and other objects, features and advantages of the present invention will become more apparent in the light of the following detailed description of preferred embodiments thereof as discussed and illustrated in the accompanying drawing.

BRIEF DESCRIPTION OF THE DRAWINGS

FIG. 3 is a cross-section view of a second portion of the turbofan section showing the engine case and a downstream stator vane.

DESCRIPTION OF THE PREFERRED EMBODIMENT

Figure 1:
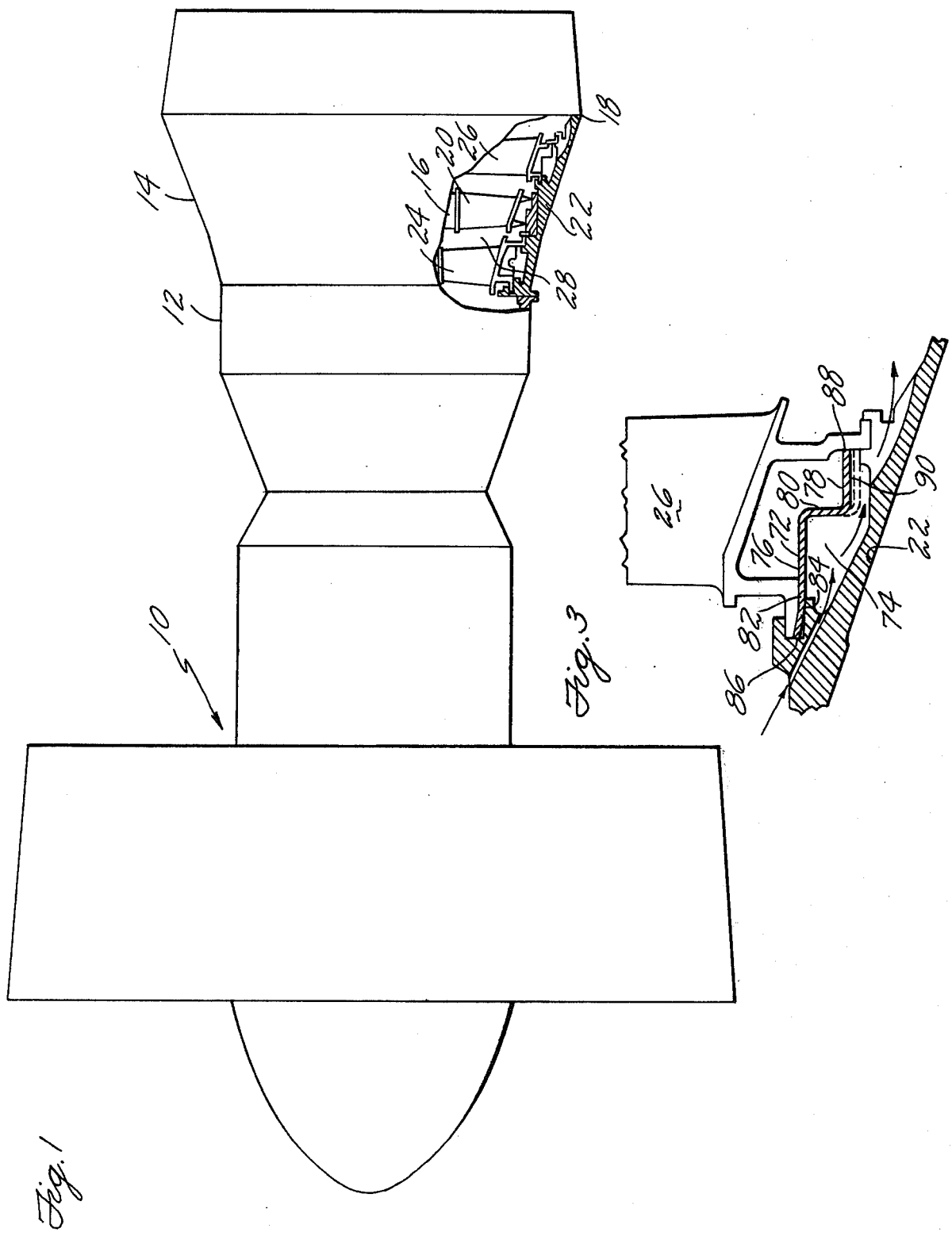
FIG. 1 is a simplified, side elevation view of a turbofan engine with a portion of a turbine case broken away to reveal rotor and stator components.

A turbofan, gas turbine engine embodiment of the invention is illustrated in FIG. 1. Principal sections of the engine include a compression section 10, a combustion section 12, and a turbine section 14. The turbine section includes a rotor assembly 16 and a stator assembly 18. The rotor assembly has a plurality of outwardly extending rotor blades 20. The stator assembly includes an engine case 22. A plurality of stator vanes, such as a first row of stator vanes, as represented by the single vane 24, is affixed to the case upstream of the rotor blades. A plurality of stator vanes, such as a second row of stator vanes, as represented by the single vane 26, is affixed to the case downstream of the rotor blades. A flow path 28 for working medium gases extends through the alternating rows of vanes and blades.

Figure 2:
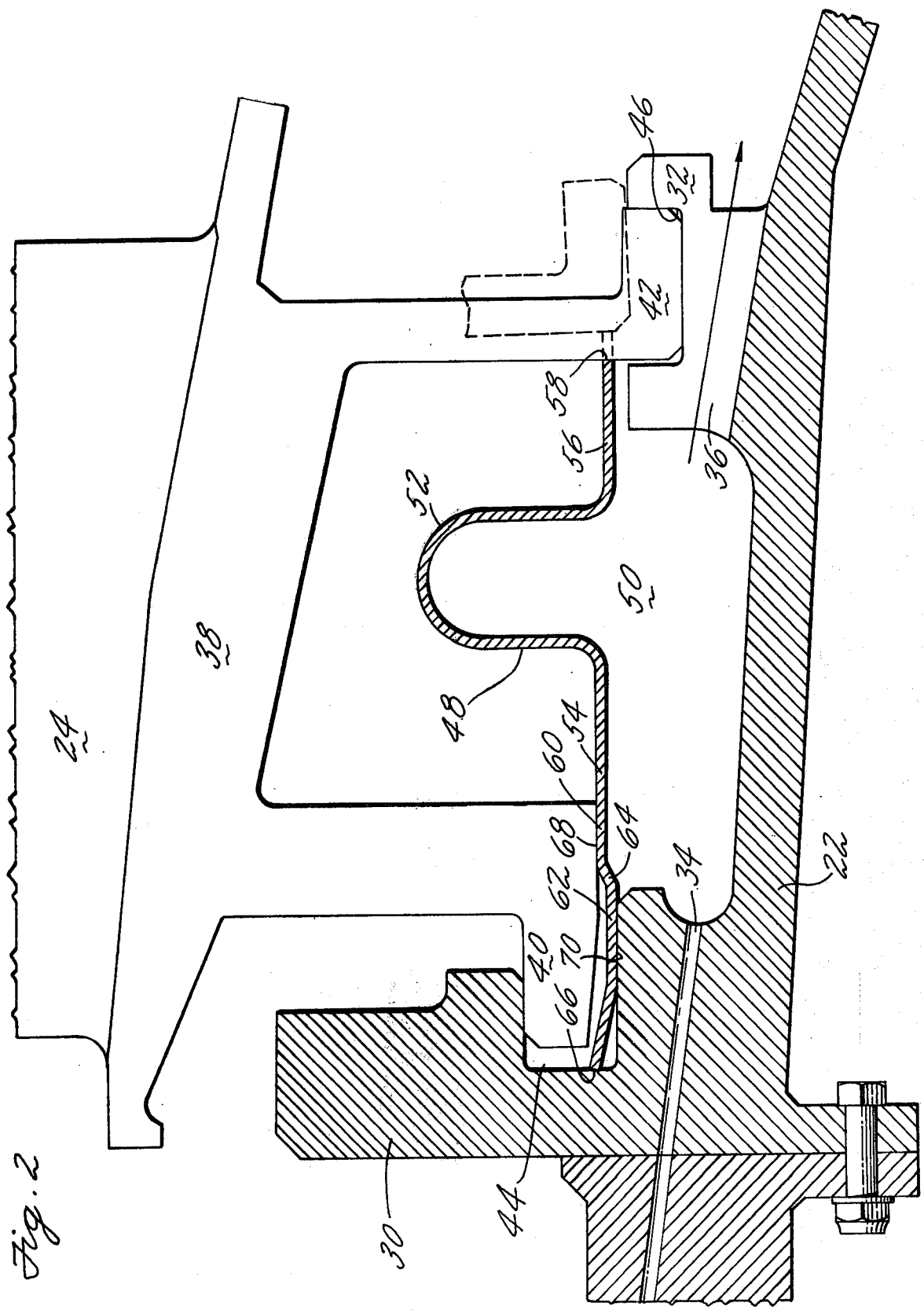
FIG. 2 is a cross-section view of a first portion of the turbine section showing the engine case and an upstream stator vane.

FIG. 2 is an enlarged cross-section view showing a portion of the engine case 22 and one of the vanes 24 of the first row of stator vanes. An upstream flange 30 and a downstream flange 32 extend inwardly from the outer case. The upstream flange extends circumferentially about the engine case and has a plurality of cooling air holes, as represented by the cooling air hole 34. The downstream flange extends circumferentially about the engine case and has a plurality of cooling air slots, as represented by the slot 36. Each stator vane has a platform 38, an upstream foot 40 and a downstream foot 42. The upstream flange has a circumferentially extending groove 44 which is adapted to receive the upstream foot. The downstream flange has a circumferentially extending groove 46 which is adapted to receive the downstream foot. A ring 48, having an omega shaped ($\Omega$) geometry, extends circumferentially about the interior of the engine to form a cooling chamber 50 between the outer case and the row of stator vanes. The ring may be circumferentially continuous or formed of a plurality of circumferentially extending segments. The ring has a flexible center section 52, an upstream leg 54, and a downstream leg 56. The flexible center section has a curved portion having a concave side and a convex side. Thicknesses in the range of fifteen thousandths (0.015) of an inch to eighteen thousandths (0.018) of an inch were found to provide sufficient flexibility in one embodiment tested. The downstream leg has a downstream end 58. The downstream end abuts the downstream foot of the vane. The upstream leg has a first cylindrical portion 60, a second cylindrical portion 62 having a larger diameter than the first cylindrical portion, a conical portion 64 extending inwardly from the second cylindrical portion, and an upstream end 66. The upstream end abuts a part of the outer case, such as an inwardly directed portion of the upstream flange. The first cylindrical portion has a inner surface 68. The inner surface abuts an axially directed portion of the upstream foot of the vane. The second cylindrical surface has an outer surface 70 which abuts an axially directed portion of the outer case such as a portion of the upstream flange. Dotted lines show the position of the downstream foot of the vane and the downstream leg of the ring during assembly. As installed, the distance between the downstream end 58 and the upstream end 66 is the installed length. Before assembly, the distance between the downstream end and the upstream end is the free length.

FIG. 3 shows a portion of the engine case 22 and one of the vanes 26 of the second row of stator vanes. A ring 72, having a "step" shaped cross section, extends circumferentially about the interior of the engine to form a cooling chamber 74. The ring has a first cylindrical portion such as a first cylindrical leg 76 and a second cylindrical portion such as a second cylindrical leg 78. The second cylindrical leg has a larger diameter than the first cylindrical leg. An essentially radial portion such as a flexible center section 80 is substantially radially directed and connects the first cylindrical leg to the second cylindrical leg. Thicknesses in the range of twenty-four thousandths (0.024) of an inch to thirty-one thousandths (0.031) of an inch were found to provide sufficient flexibility in one embodiment tested. The first cylindrical leg has an inner surface 82, an outer surface 84, and an upstream end 86. A portion of the outer surface abuts an axially extending portion of the outer case. The inner surface of the first cylindrical leg abuts an axially extending portion of the downstream vane 26. The second cylindrical leg has a downstream end 88 and an outer surface 90. Dotted lines show the position of the second cylindrical leg at engine operating temperatures.

During the operation of a gas turbine, hot working medium gases flow axially into a turbine section of the engine. Components of the turbine including the stator vanes 24, the ring 48, the stator vanes 26, the ring 72 and the engine case 22 are heated by the working medium gases. High pressure cooling air cools the turbine case and prevents gas path air from entering the cooling chamber 50. As the engine approaches steady state conditions, the ring 48 expands outwardly further than does the engine case. The upstream leg 54 and the downstream leg 56 press against the engine case in a substantially radially oriented direction. In particular, the second cylindrical portion 62 of the upstream leg presses outwardly against the outer case. The downstream leg presses outwardly against the downstream flange 32.

The ring 48 engages the case 22 and the row of stator vanes 24 in an axially oriented direction to block the leakage of cooling air into the flow path 28. As shown in FIG. 2, the upstream end 66 of the ring 48 presses against the case. The downstream end 58 of the ring presses against each downstream foot 42 of the row of stator vanes 24. Compression of the flexible center section 52 of the ring during assembly causes each end of the ring to exert a sealing force in the axial direction against the case and the downstream foot of the vane. The axial thermal growth of the ring increases this sealing force. The sealing force is further increased by the cooling air as the air flows through the holes 34 into the cooling chamber 50 and out through the cooling air slots 36. The cooling air is at a higher pressure than are the working medium gases. The concave portion of the ring faces the higher pressure cooling air. The difference in pressure between the cooling air and the working medium gases enables the cooling air to exert a force against the radial faces of the ring, thereby increasing the axial force transmitted through the legs of the ring to the case and to the vane foot. Vibrational energy in the stator vanes 24 is dissipated as heat both by the rubbing contact between the downstream end of the ring and the downstream foot 42 of the vane and by the rubbing contact between the first cylindrical portion 60 of the upstream leg and the upstream foot 40 of the vane. Additional damping in the form of viscous damping results from vibrations in each stator vane being transmitted to the ring. The flexible center section of the ring translates axially and causes pumping of the cooling air.

In a similar fashion cooling air enters the cooling chamber 74 to pressurize the cooling chamber and to cool the turbine case. Compression of the flexible center section 80 during assembly causes the upstream end 86 and the downstream end 88 of the ring to exert a sealing force in the axial direction against the case and the vane. Vibrational energy in the vane is dissipated by rubbing between the upstream leg and the case and the downstream leg and the vane. Viscous damping of the vane results from the flexible center section translating axially. As the engine approaches steady state conditions, the ring expands outwardly further than does the engine. The outer surface 90 of the ring presses against the flange on the engine case. A secondary seal is formed by the inner surface of the ring 82 pressing against the upstream foot of the vane and the outer surface of the ring 84 pressing against the case to further inhibit leakage of the cooling air from the cooling chamber into the flow path 28.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. In a gas turbine engine of the type having a stator assembly including an engine case and a plurality of vanes extending inwardly therefrom, the improvement which comprises:
   a ring extending circumferentially about the interior of the case to form a chamber therebetween and having,
   a first end which engages the engine case,
   a second end which engages at least one of said vanes, and
   a radial center section between the first end and the second end, which is free to deflect axially and which extends radially to impart axial flexibility,
   wherein the ring has a free length between the ends and an installed length between the ends that is smaller than the free length and wherein each end is adapted to exert a sealing force against the adjacent stator assembly in a generally axial direction.

2. The invention according to claim 1 wherein said flexible center section has a curved portion which is compressed at installation to conform the ring to the installed length.

3. The invention according to claim 1 wherein the ring is formed of a plurality of circumferentially extending segments.

4. The invention according to claim 1 wherein said flexible center section has,
   a first cylindrical portion having a first diameter,
   a second cylindrical portion having a second diameter which is not equal to the first diameter, and
   at least one essentially radial portion joining said first cylindrical portion to said second cylindrical portion, the essentially radial portion deflecting at installation to conform the ring to the installed length.

5. The invention according to claim 1 wherein:
   a straight, first leg extends between the center section and the first end,
   a straight, second leg extends between the center section and the second end, and
   the center section of the ring has an omega shaped ($\Omega$) geometry.

6. The invention according to claim 2 wherein the ring is adapted to separate a fluid having a static pressure from a second fluid having a greater static pressure and wherein said center section has a concave side which is contoured to face the fluid having the greater static pressure.

7. The invention according to claim 2 or 4 wherein the ring further has a leg which extends between the flexible center section and the end of the ring that engages the engine case and wherein the leg engages the engine case.

8. The invention according to claim 7 wherein each of said vanes has a foot that engages the engine case and wherein the leg of the ring is engaged by at least one foot and the engine case and is trapped therebetween.

9. The invention according to claim 8 wherein the leg of the ring has a first cylindrical portion and a second cylindrical portion of greater diameter than the first cylindrical portion and wherein the first cylindrical portion engages at least one foot and the second cylindrical portion engages the engine case.

10. The invention according to claim 4 wherein said flexible center section has a "step" shaped geometry.

11. The invention according to claim 10 wherein said ring has a thickness which is in the range of twenty-four thousandths (0.024) of an inch to thirty-one thousandths (0.031) of an inch.

12. The invention according to claim 5 wherein said ring has a thickness which is in the range of fifteen thousandths (0.015) of an inch to eighteen thousandths (0.018) of an inch.

13. A ring adapted to extend circumferentially about the interior of a gas turbine engine, the engine having an array of stator vanes and an engine case, which comprises:
   a first end which is adapted to engage the engine case,
   a second end which is adapted to engage at least one of said vanes, and
   a radial center section between the first end and the second end, which is free to deflect axially and which extends radially to impart axial flexibility,
   wherein the ring has a free length between the ends and is adapted to have an installed length between the ends that is smaller than the free length and wherein each end is adapted to exert a sealing force against the adjacent stator assembly in a generally axial direction.

14. The invention according to claim 13 wherein:
   a straight, first leg extends between the center section and the first end,
   a straight, second leg extends between the center section and the second end, and
   the center section of the ring has an omega shaped ($\Omega$) geometry.

15. The invention according to claim 13 wherein said flexible center section has a "step" shaped geometry.

* * * * *